US012801136B2

(12) United States Patent
Audronis

(10) Patent No.: US 12,801,136 B2
(45) Date of Patent: Nov. 17, 2026

(54) SYSTEMS AND METHODS FOR FUSING SENSOR DATA FROM DRONES IN A VIRTUAL ENVIRONMENT

(71) Applicant: Tempest Droneworx, Inc., Houston, TX (US)

(72) Inventor: Tyris Monte Audronis, Houston, TX (US)

(73) Assignee: Tempest Droneworx, Inc., Houston, TX (US)

( * ) Notice: Subject to any disclaimer, the term of this patent is extended or adjusted under 35 U.S.C. 154(b) by 130 days.

(21) Appl. No.: 18/499,090

(22) Filed: Oct. 31, 2023

(65) Prior Publication Data

US 2024/0142978 A1 May 2, 2024

Related U.S. Application Data

(60) Provisional application No. 63/381,652, filed on Oct. 31, 2022.

(51) Int. Cl.
*G05D 1/00* (2024.01)

(52) U.S. Cl.
CPC ......... *G05D 1/0094* (2013.01); *G05D 1/0022* (2013.01)

(58) Field of Classification Search
CPC ............... G05D 1/0094; G05D 1/0022; G05D 2105/87; G05D 1/225; G05D 1/689; G05D 1/6987; G05D 1/2247; G05D 2109/254; B64U 2101/32
See application file for complete search history.

(56) References Cited

U.S. PATENT DOCUMENTS

| | | | | |
|---|---|---|---|---|
| 10,636,209 | B1 * | 4/2020 | Thaller | G06F 8/44 |
| 2017/0192424 | A1 | 7/2017 | Poole et al. | |
| 2018/0058864 | A1 * | 3/2018 | Lection | G01C 21/3415 |

(Continued)

FOREIGN PATENT DOCUMENTS

| | | | |
|---|---|---|---|
| EP | 4024155 | A1 | 7/2022 |
| EP | 4612639 | A1 | 9/2025 |

OTHER PUBLICATIONS

International Search Report and Written Opinion for International Application No. PCT/US2023/036518, Search completed Jan. 10, 2024, Mailed Feb. 14, 2024, 11 Pgs.

(Continued)

*Primary Examiner* — Anne Marie Antonucci
*Assistant Examiner* — Luis G Del Valle
(74) *Attorney, Agent, or Firm* — KPPB LLP

(57) ABSTRACT

Systems and methods for fusing sensor data from drones in a virtual environment are described In one embodiment, a method for fusing sensor data from drones in a virtual environment includes obtaining geometry data describing a real-world landscape, drawing a map within a virtual environment using a 3-D visualization software and the geometry data, placing a plurality of projectors on the map within the virtual environment corresponding to sensors in the region of the real-world landscape, receiving sensor data and location data from the sensors; and projecting the sensor data onto the map at locations indicated by the location data using the projectors corresponding to the sensors that the sensor data is received from.

22 Claims, 12 Drawing Sheets
(7 of 12 Drawing Sheet(s) Filed in Color)

(56) References Cited

U.S. PATENT DOCUMENTS

| | | | |
|---|---|---|---|
| 2019/0378423 | A1 | 12/2019 | Bachrach et al. |
| 2020/0035030 | A1 * | 1/2020 | Schradin ................. G06T 17/05 |
| 2020/0073385 | A1 | 3/2020 | Jobanputra et al. |
| 2021/0334538 | A1 * | 10/2021 | Marotta ............... G06Q 10/087 |
| 2022/0066456 | A1 | 3/2022 | Ebrahimi Afrouzi et al. |
| 2023/0353763 | A1 * | 11/2023 | Klement ................ H04N 19/33 |
| 2023/0400327 | A1 * | 12/2023 | Streem ................. G01C 21/005 |

OTHER PUBLICATIONS

International Preliminary Report on Patentability for International Application PCT/US2023/036518, Report issued Apr. 29, 2025, Mailed May 15, 2025, 10 Pgs.

Extended European Search Report for European Application No. 23886652.9, Search completed Sep. 2, 2026, Mailed Sep. 7, 2026, 8 pgs.

* cited by examiner

FIG. 10
THERMAL (IR)
RTB & Land
BACK

SYSTEMS AND METHODS FOR FUSING SENSOR DATA FROM DRONES IN A VIRTUAL ENVIRONMENT

RELATED APPLICATIONS

The current application claims the benefit of and priority under 35 U.S.C. § 119(e) to U.S. Provisional Patent Application No. 63/381,652, entitled "Systems and Methods for Fusing Sensor Data from Drones in a Virtual Environment" to Tyris Monte Audronis, filed Oct. 31, 2022, the disclosure of which is hereby incorporated by reference in its entirety.

BACKGROUND

An unmanned vehicle, or drone is a type of vehicle that can be powered or unpowered without a person directly operating it onboard. The vehicle can be operated remotely (e.g., by a human operator/pilot) or autonomously (e.g., using sensors and/or navigational programming). Unmanned vehicles can be designed for different environments, such as, but not limited to, unmanned aerial vehicles (UAV), unmanned ground vehicles (UGV), unmanned surface vehicles (USV), and unmanned underwater vehicles (UUV).

Drones can utilize any of a variety of sensors such as, but not limited to, cameras, infrared (thermal) sensors, LiDAR (Light Detection and Ranging), sonar, etc. At an elevated vantage point, UAVs having onboard sensors can often collect data at a greater range and with less influence from obstructions than if they were on the ground. UGVs, USVs, and UUVs with sensors can traverse and collect information in environments that are difficult or undesirable for a human.

Drones for information gathering over a large area are particularly useful in emergency and disaster situations. With little to no direct human supervision, they can obtain visual and other information at great speed and effectiveness to enhance planning and remediation by responders.

SUMMARY OF THE INVENTION

Systems and methods for fusing sensor data from drones in a virtual environment are described In one embodiment, a method for fusing sensor data from drones in a virtual environment includes obtaining geometry data describing a real-world landscape, drawing a map within a virtual environment using a 3-D visualization software and the geometry data, placing a plurality of projectors on the map within the virtual environment corresponding to sensors in the region of the real-world landscape, receiving sensor data and location data from the sensors; and projecting the sensor data onto the map at locations indicated by the location data using the projectors corresponding to the sensors that the sensor data is received from.

BRIEF DESCRIPTION OF FIGURES

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DISCLOSURE OF THE INVENTION

Turning now to the drawings, systems and methods for fusing sensor data from drones in a virtual environment are described. Drones can be used to collect information over large geographic areas via onboard sensors. As will be discussed further below, information from multiple drones can be merged or fused live or close to real-time into a virtual environment (a virtual representation within a computing system) that is representative of the physical real-world environment traversed by the drones. The virtual environment can be implemented in a computing system using 3-D visualization software such as a game engine (e.g., Unity, Unreal Engine, Godot, etc.). An initial map can be set up in the virtual environment using real-world geographic information concerning the area of interest (e.g., landscape, buildings, physical features, etc.), which can be referred to as geometry data. Information captured by sensors on the drones (e.g., a video feed) or other sensor systems (e.g., stationary cameras) can then be projected or superimposed onto the map built from geometry data. The drones can follow defined paths, navigate autonomously, or be manually controlled to cover as much of the area of interest as possible. A user interface displays the virtual environment and can provide controls for a user to direct a drone to a specific location. In this way, a user can visually review information over large areas live or in close to real-time via systematic navigation of the one or more drones.

Systems for Collecting Sensor Data from Drones

Figure 1A:
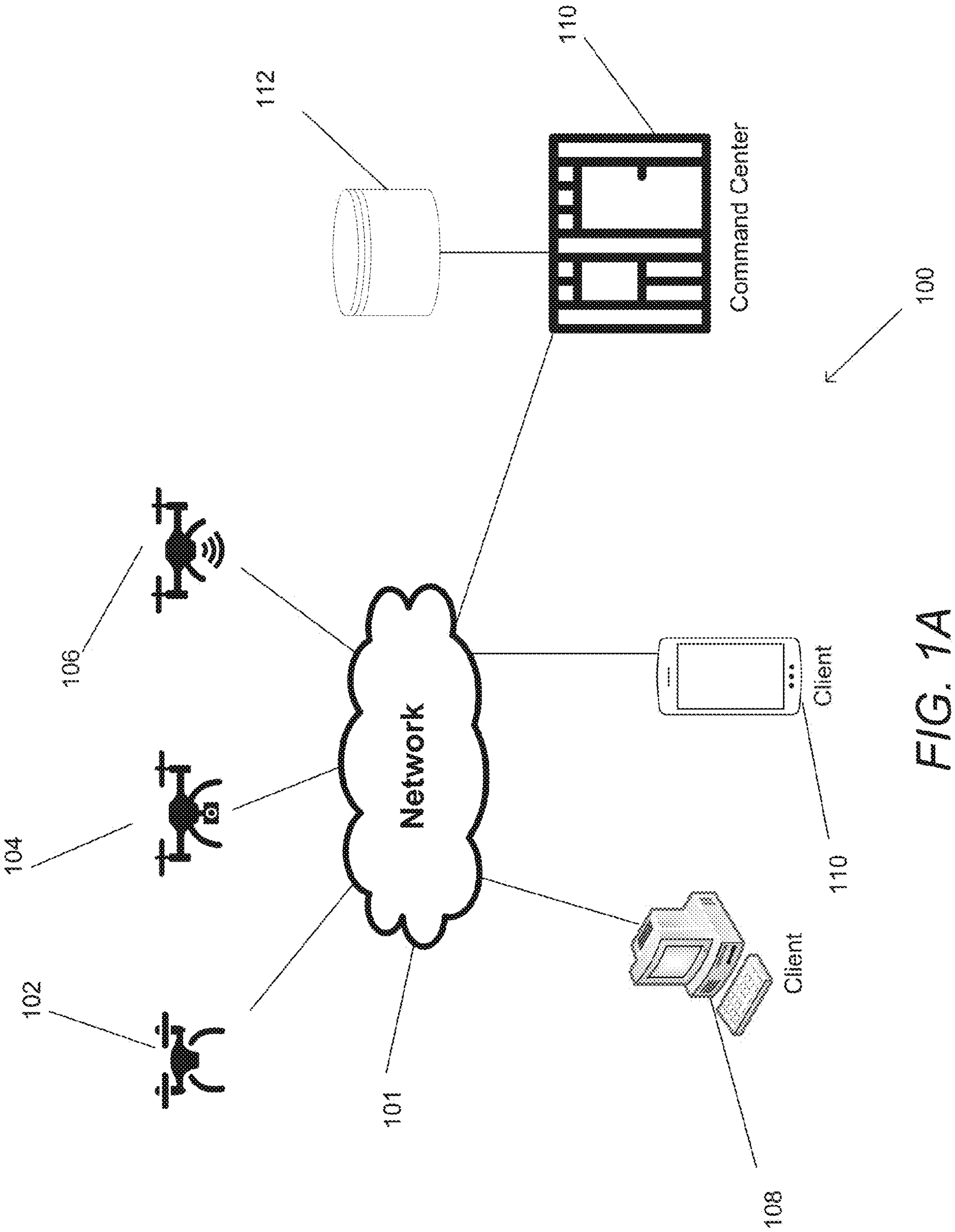
FIG. 1A illustrates a system for collecting sensor data from drones in accordance with an embodiment of the invention.

FIG. 1A illustrates a system 100 for collecting sensor data from drones in accordance with an embodiment of the invention that includes one or more drones 102, 104, and 106, a drone command center 110, a data center 112, and one or more client devices 108 and 110. In the illustrated embodiment, the entities can communicate over a wide area network 101, such as the internet. Drones can include those adapted for different environments, such as, but not limited to, unmanned aerial vehicles (UAV), unmanned ground vehicles (UGV), unmanned surface vehicles (USV), and unmanned underwater vehicles (UUV). Each drone should include at least one sensor. Sensors can include, but are not limited to, cameras, infrared (thermal) sensors, LiDAR (Light Detection and Ranging), sonar, olfactory/particle sensors, auditory sensors, etc. Further embodiments of the invention can include cameras and/or other types of sensors 114 that are not mounted on drones. These sensors may be stationary, and may have an associated GPS (global positioning system) circuitry or system that identifies their location. For example, a camera or sensor can have an embedded GPS tracker or may be mounted to another system (e.g., a structure or a non-moving vehicle) that includes a GPS. Some stationary camera systems can include, for example, public wildfire monitoring systems.

The drone command center 110 can include controller interfaces for the drones. In several embodiments of the invention, each drone has its own associated controller interface, e.g., Pixhawk Cube. The drone command center 110 may also have one or more computing systems that can coordinate the controller interfaces, execute a 3-D visualization software application (e.g., game engine) for the virtual environment, and/or generate information for a user interface on the one or more client devices 108 and 110 to display the virtual environment. Processes that may be performed at a drone command center 110 include those discussed further below.

The data center 112 can include one or more databases. Databases can store drone information/metadata and geometry data. As will be discussed further below, drone metadata includes information about the capabilities of each drone or information to configure each drone. Geometry information includes mapping data of some location in the real world that can be used to render a virtual environment. Notably, in some embodiments, separate data centers can house databases for different types of information.

Figure 1B:
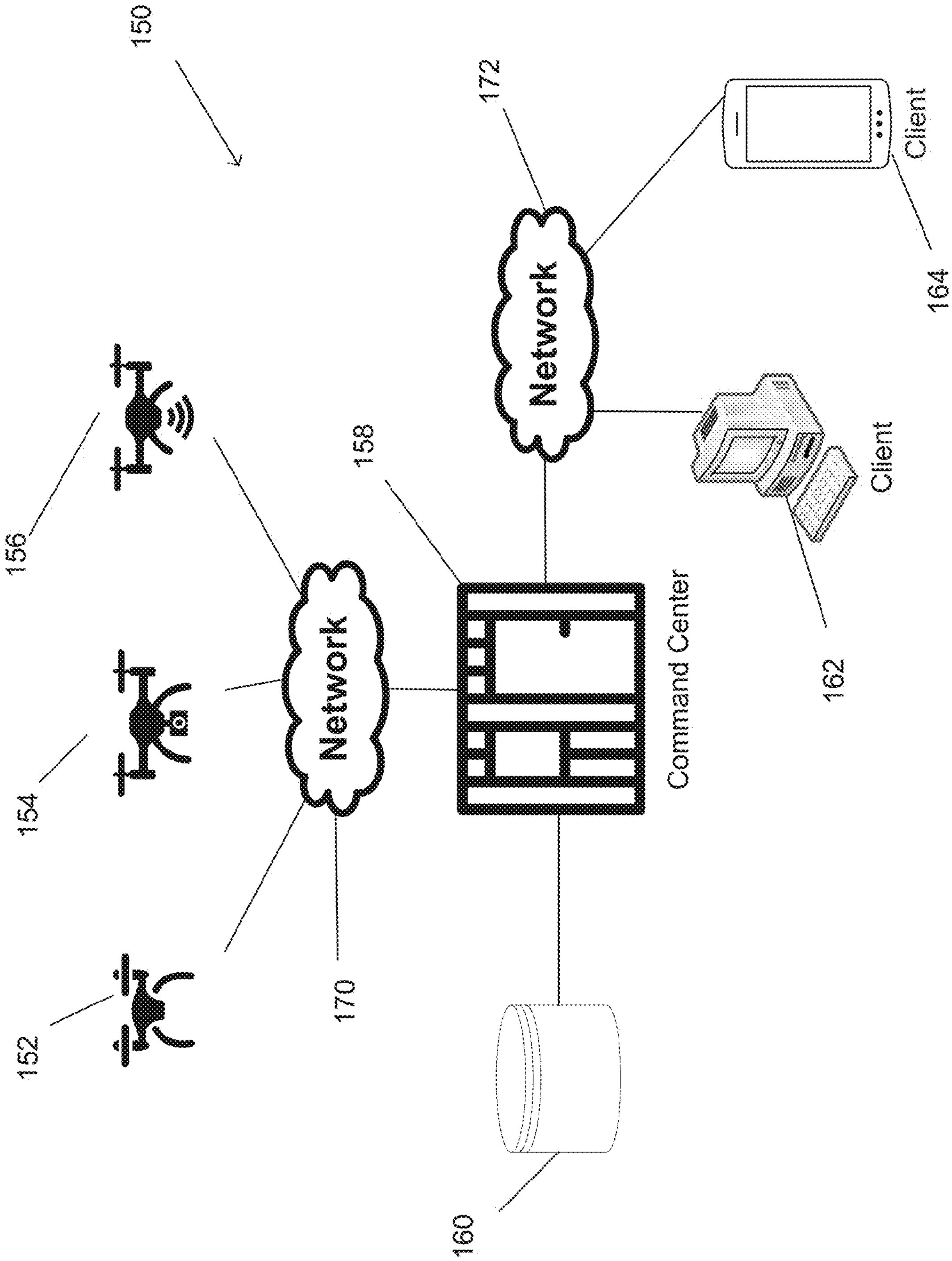
FIG. 1B illustrates a system for collecting sensor data from drones in accordance with an embodiment of the invention.

FIG. 1B illustrates a system 150 for collecting sensor data from drones in accordance with another embodiment of the invention. Similar to system 100, the system includes one or more drones 152, 154, and 156, a drone command center 158, a data center 160, one or more client devices 162 and 164, and a stationary camera or other sensor 174. In the illustrated embodiment, different groups of entities in the system can communicate over different networks 170 and 172. Networks 170 and 172 can be, for example, two local area networks or one local network and the internet.

Figure 2:
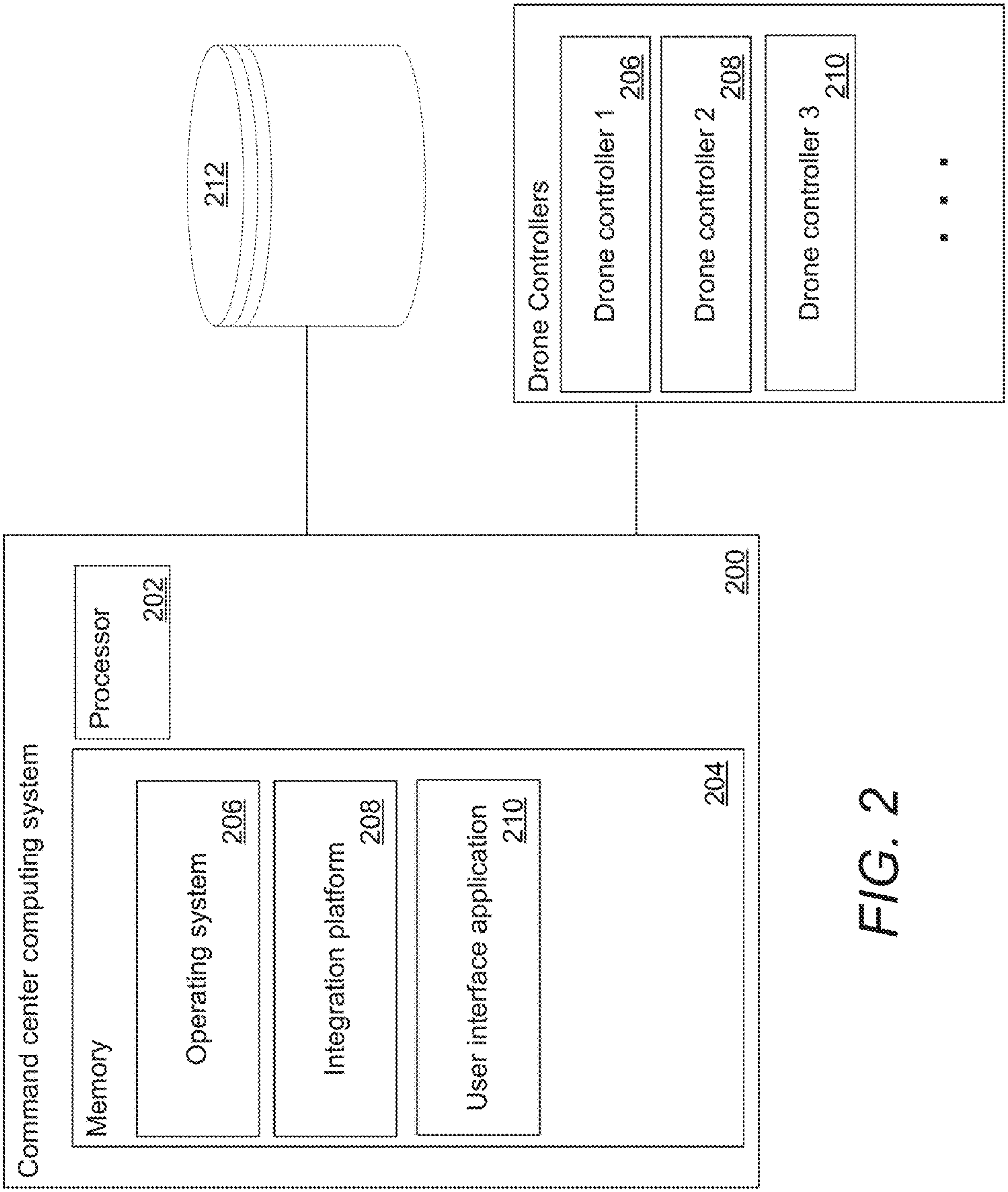
FIG. 2 conceptually illustrates a command center computing system in accordance with an embodiment of the invention.

A computing system that may be utilized at a command center in accordance with embodiments of the invention is conceptually illustrated in FIG. 2. The computing system 200 includes a processor 202 and memory 204. The memory 204 contains processor instructions for executing an operating system 206, a sensor data integration platform 208, and a user interface application 210. The computing system 200 can access a data center 212 as mentioned further above. The computing system 200 may also interface with one or more drone controllers 206, 208, and 210 that are configured to control drones (e.g., drones 102, 104, and 106 as in FIG. 1). Drone controllers can be any suitable type or model, such as the Pixhawk Cube.

Geometry Data

Rendering a virtual environment in accordance with embodiments of the invention involves collecting initial geometry data for constructing a base landscape or map. Geometry data is information that gives a representation of the shape of bare ground (bare earth) topographic surface of the Earth. In some embodiments, geometry data can also include trees, buildings, and other surface objects. Geometry data can be obtained in any of a variety of ways, such as by retrieving from data sources that can be queried or have APIs. When the system has a network connection, Internet sources can include retrieving geometry data from a server such as, but not limited to, Esri ArcGIS, Google Earth, Google Maps, United States Geological Survey (USGS) digital elevation model (DEM), or Mapbox. When there is no network connection, or without needing to use a network connection, the system can accept locally generated geometry data. For example, drones or other devices can be used to collect geometry data using LiDAR.

While geometry data can be organized in any of a variety of ways, many embodiments utilize layers as logical collections of data for creating maps, scenes, and analysis. The data can include different aspects of an area, such as topography, elevation, natural features, buildings, etc.

Map of Virtual Environment

In many embodiments of the invention, the virtual environment can be built using a 3-D visualization software application, such as a game engine, based on geometry data. Unity, Unreal Engine, and Godot are examples of game engines that may be utilized in accordance with embodiments of the invention.

Figure 7:
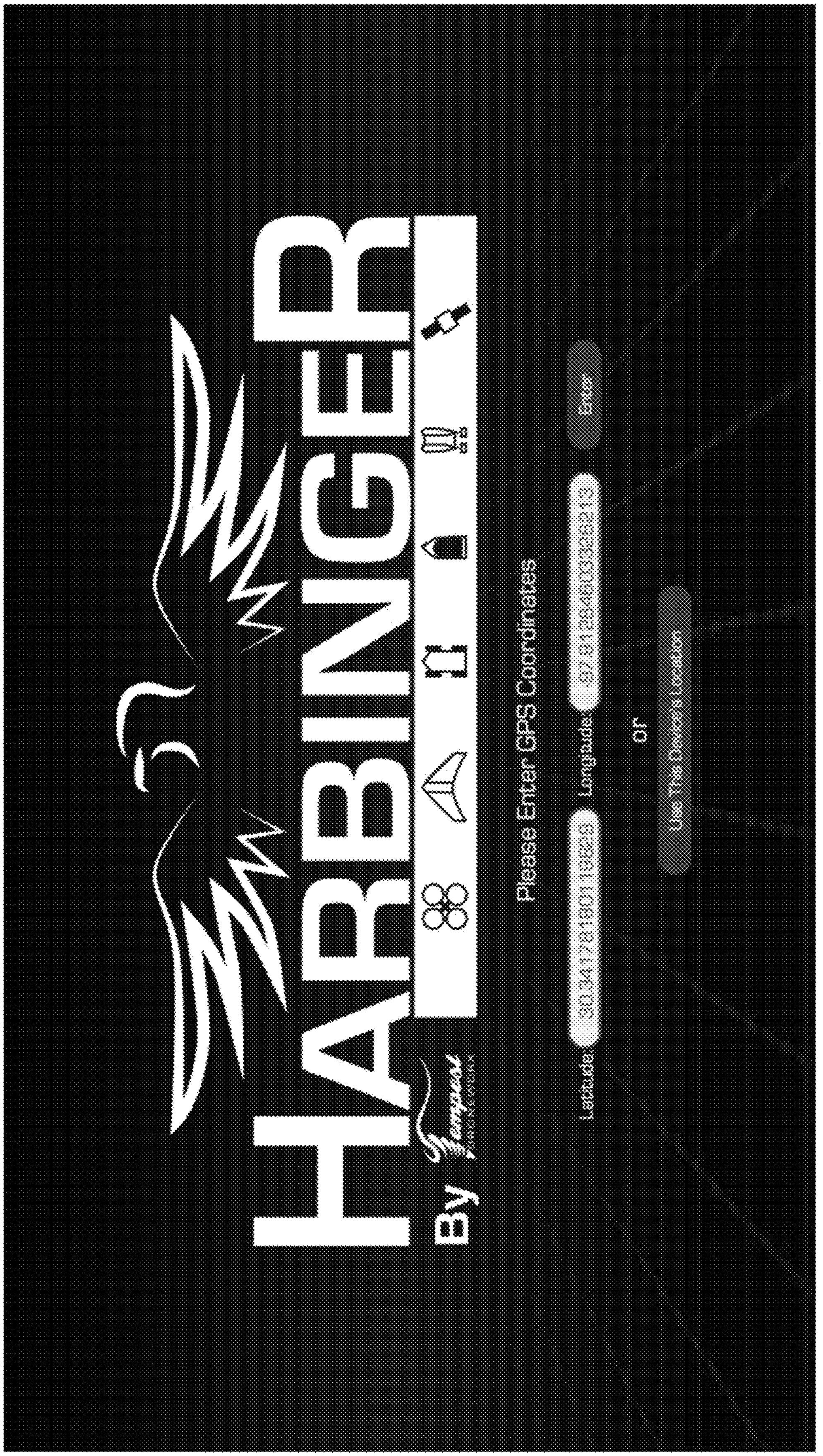
FIG. 7 is an example of a graphical user interface screen for obtaining input concerning a location.

The geographic background or structure of the virtual environment, which can be constructed from geometry data, can be referred to as a map. The map can be centered on a location as directed by a user or provided by the GPS of a device (e.g., a mobile device). For example, a user interacting with a graphical user interface may enter GPS coordinates (e.g., in WGS83 format) or click on a location in the interface. Alternatively, a location can be determined without user input from the GPS onboard a mobile device that the user is using to view the map. An example of a graphical user interface screen for obtaining input concerning a location for centering the map is shown in FIG. 7. If coordinates are given in a different coordinate system (e.g., hours/minutes/seconds), it can be converted to WGS83 or another common format that is accepted by the system.

Placing Drones and Sensor Data on Map

Active drones can be placed on the map as projectors within the virtual environment. Many 3-D visualization software application, such as a game engines, include a projector component, which is a class that can be instantiated and used to project any material onto a scene. As will be discussed in greater detail further below, image, video, or other sensor data collected by each drone can be projected onto the map with proper placement given telemetry data of the drone. In many embodiments, information on how to attain and parse telemetry data of a drone may be stored in and retrieved from a database such as data center 112 or 160 above. The database includes information for each drone to be used such as, but not limited to, drone type, how to obtain and parse telemetry, command hash table, control type, and format of video or other sensor data captured by the drone. Collectively this type of information can be referred to as drone metadata. Telemetry data can include coordinates of the current location of the drone and position of the camera or sensor (e.g., gimbal orientation), and may be stored in JSON or XML format. In several embodiments of the invention, the sensor data is provided in XML.

Processes for Fusing Sensor Data from Drones in a Virtual Environment

Figure 3:
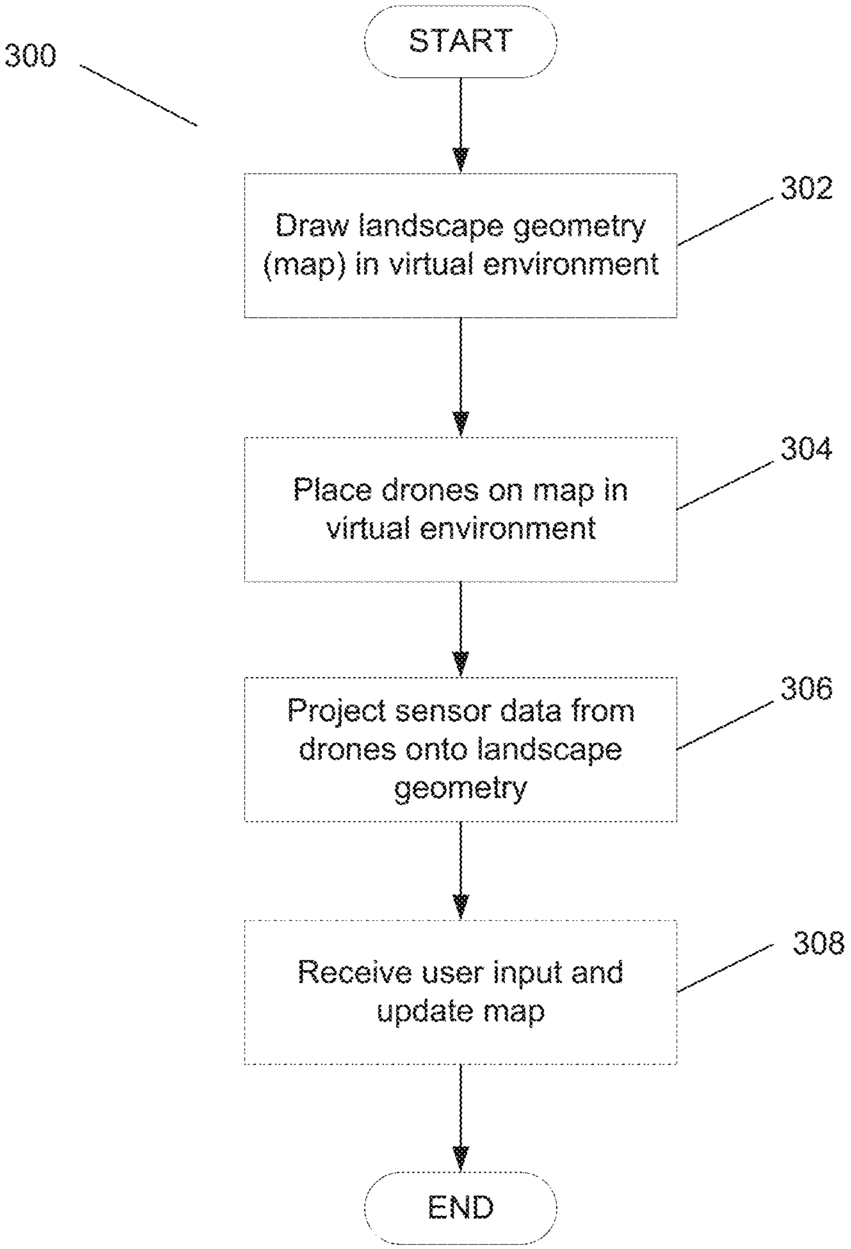
FIG. 3 illustrates a process for collecting and displaying sensor data in accordance with an embodiment of the invention.

A computing system at a command center or elsewhere can coordinate multiple drones to collect sensor data for display in a virtual environment. A process for collecting and displaying sensor data in accordance with an embodiment of the invention is illustrated in FIG. 3. The process 300 includes drawing (302) a landscape geometry, or map, in a virtual environment using 3-D visualization software. As discussed further above, geometry data for rendering the map can be obtained from any of a variety of sources (e.g., Esri ArcGIS, Google Earth, Google Maps, USGS), Mapbox, etc.).

The active drones are placed (304) on the map using their locations (e.g., each as provided by their GPS). Drones are active when they are contributing sensor data. In many embodiments of the invention, the drones are implemented as projector components as provided by the 3-D visualization software within the virtual environment. Additional detail of processes for placing drones on a map will be discussed further below with respect to FIG. 4.

Sensor data from the active drones that have been placed on the map are projected (306) onto the map using the projectors corresponding to each active drone. Additional details of processes for projecting sensor data on a map will be discussed further below with respect to FIG. 5.

User input captured (308) on a graphical user interface may instruct a drone to travel to a location or in a particular direction. The user input may be entered as coordinates (e.g., WGS83 format). Alternatively, the user input may be indicative of a direction (e.g., elevation up/down, slide left/right, forward, and reverse). Updating drone tasking from user input will be discussed in greater detail below with respect to FIG. 6.

Although a specific process is described above with respect to FIG. 3, one skilled in the art will recognize that any of a variety of processes may be utilized in accordance with embodiments of the invention.

Processes for Placing Drones on a Map

Figure 4:
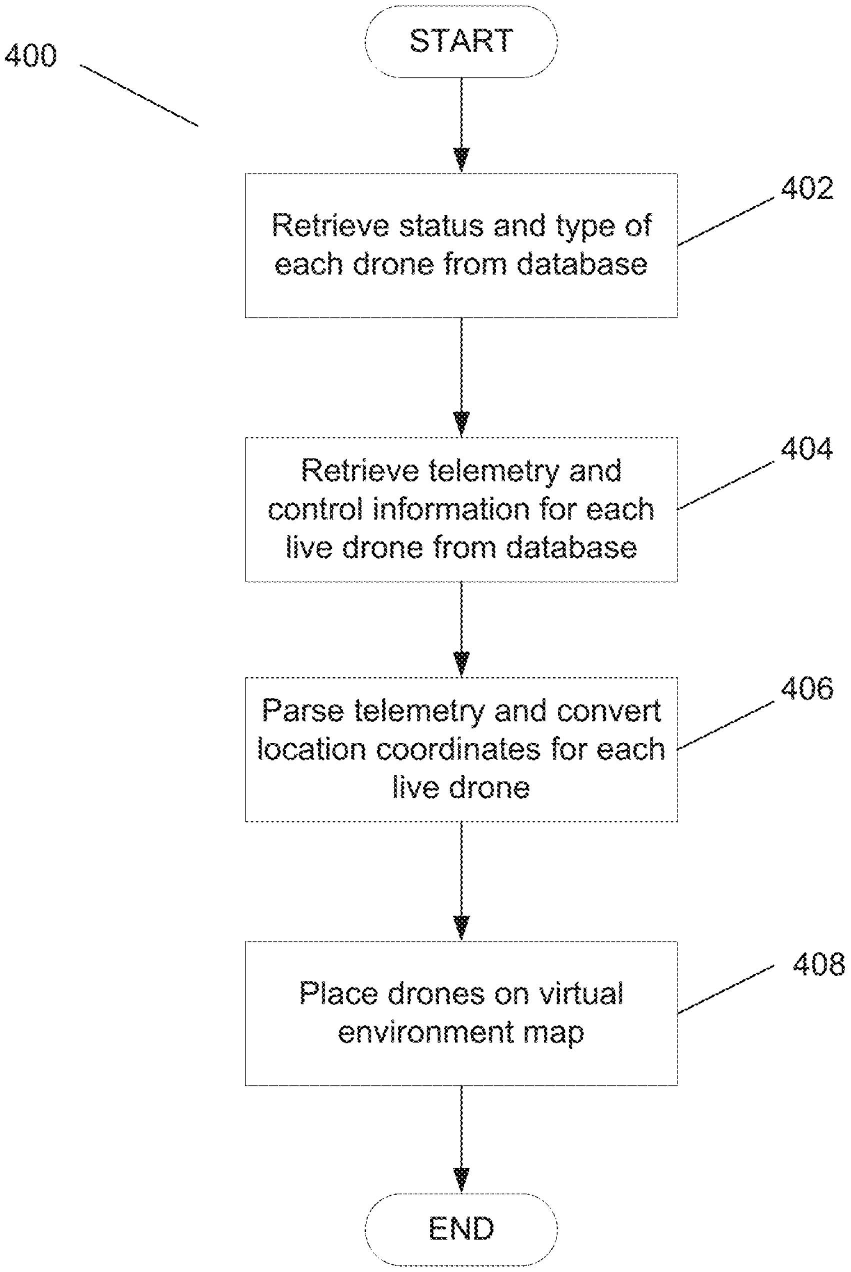
FIG. 4 illustrates a process for placing drones on a map in accordance with an embodiment of the invention.

Processes in accordance with embodiments of the invention can retrieve information or metadata about the drones to be able to interface with them and facilitate conveying location and sensor data to the command center. Such processes maybe utilized, for example, in drone placement 304 of FIG. 3. A process in accordance with an embodiment of the invention is illustrated in FIG. 4.

The process 400 includes retrieving (402) the status and type of each live drone from the drone information database. The statuses can include active and inactive. Active status can indicate the drone is out in the real-world environment and ready to transmit data (e.g., a UAV is "launched"). Inactive status can indicate the drone is withdrawn from the field or powered down. In many embodiments of the invention, the area of interest is divided into sectors, and drones are assigned to sectors. The drones can be programmed using controllers such as those described further above to traverse their assigned sectors, for example, by providing waypoints.

A list can be created of drones having active status. Then for each of the drones in the list, telemetry and control information is retrieved (404) from the drone information database. Telemetry and control information can include, but is not limited to, a command hash table, drone control type, native sensor data format of sensor(s) on the drone, and/or information for converting the native sensor data format to a uniform format.

Telemetry is retrieved from one or more of the active drones. Telemetry can include, but is not limited to, location of the drone and sensor data captured by one or more sensors on the drone. In several embodiments of the invention, at least one sensor on a drone is a video camera providing a video feed or stream as sensor data.

Figure 8:
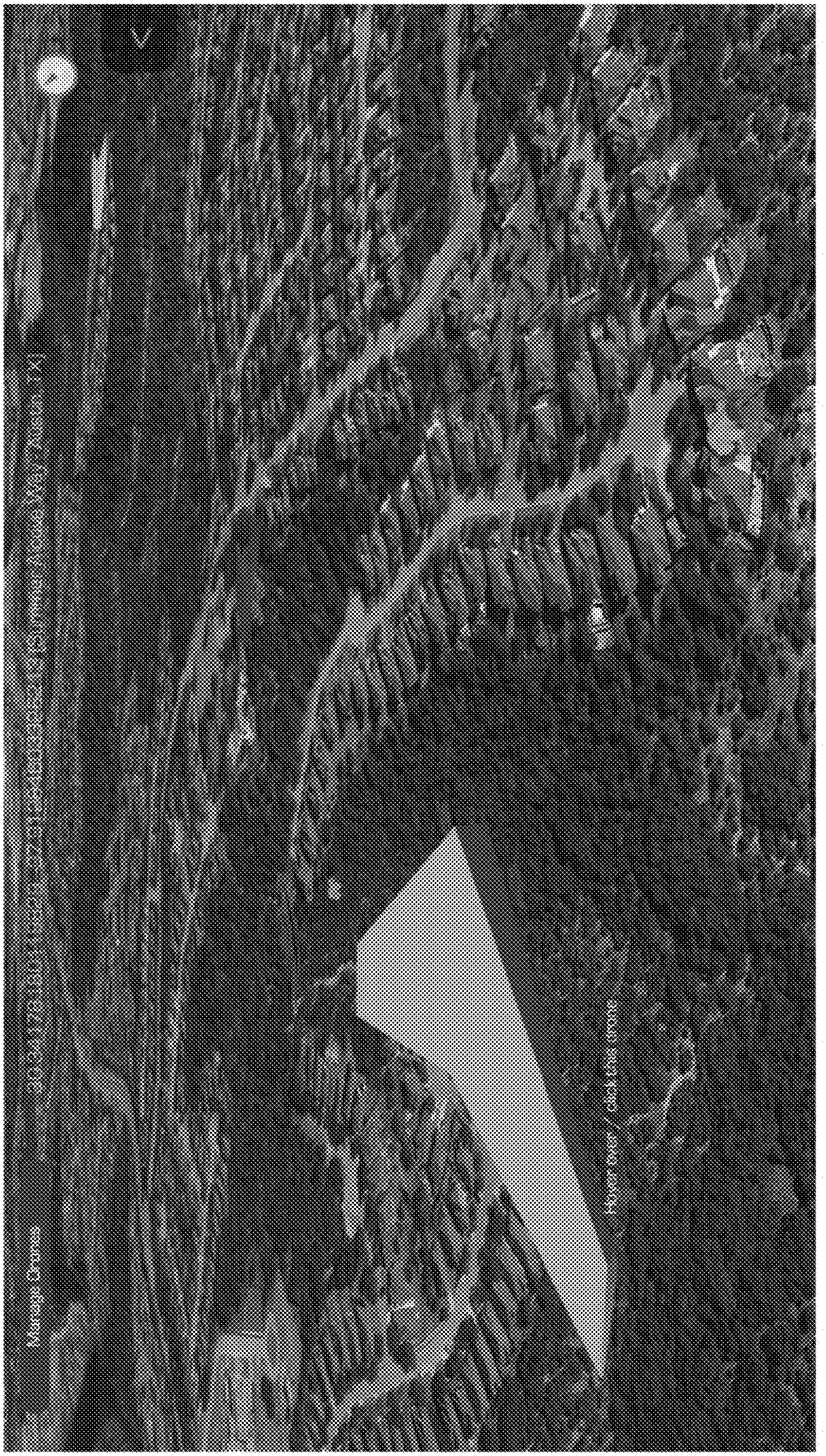
FIG. 8 is an example of a graphical user interface showing a map and several placed drones.

The telemetry is parsed (406) and location coordinates for the drone(s) are converted into the coordinate system of the virtual environment. Telemetry may be in a suitable storage or messaging data format, such as JSON or XML. In some embodiments of the invention, drone location coordinates are provided as WGS83 format and converted into vector 3 coordinates (x, y, z) for the virtual environment. Furthermore, AGL (above ground level) altitude can be converted to MSL (mean sea level) altitude. An icon for the drone(s) is displayed (408) in the virtual environment at the vector 3 coordinates. A projector can be associated with the icon within the virtual environment for adding sensor data to be displayed on the map as will be described further below. Similarly, any new drones that are discovered or become active can be added to the map by an icon and projector. An example screen of a graphical user interface showing a map and several placed drones represented by icons in accordance with an embodiment of the invention is illustrated in FIG. 8.

Although a specific process is described above with respect to FIG. 4, one skilled in the art will recognize that any of a variety of processes may be utilized in accordance with embodiments of the invention.

Processes for Projecting Sensor Data from Drones onto a Map

Figure 5:
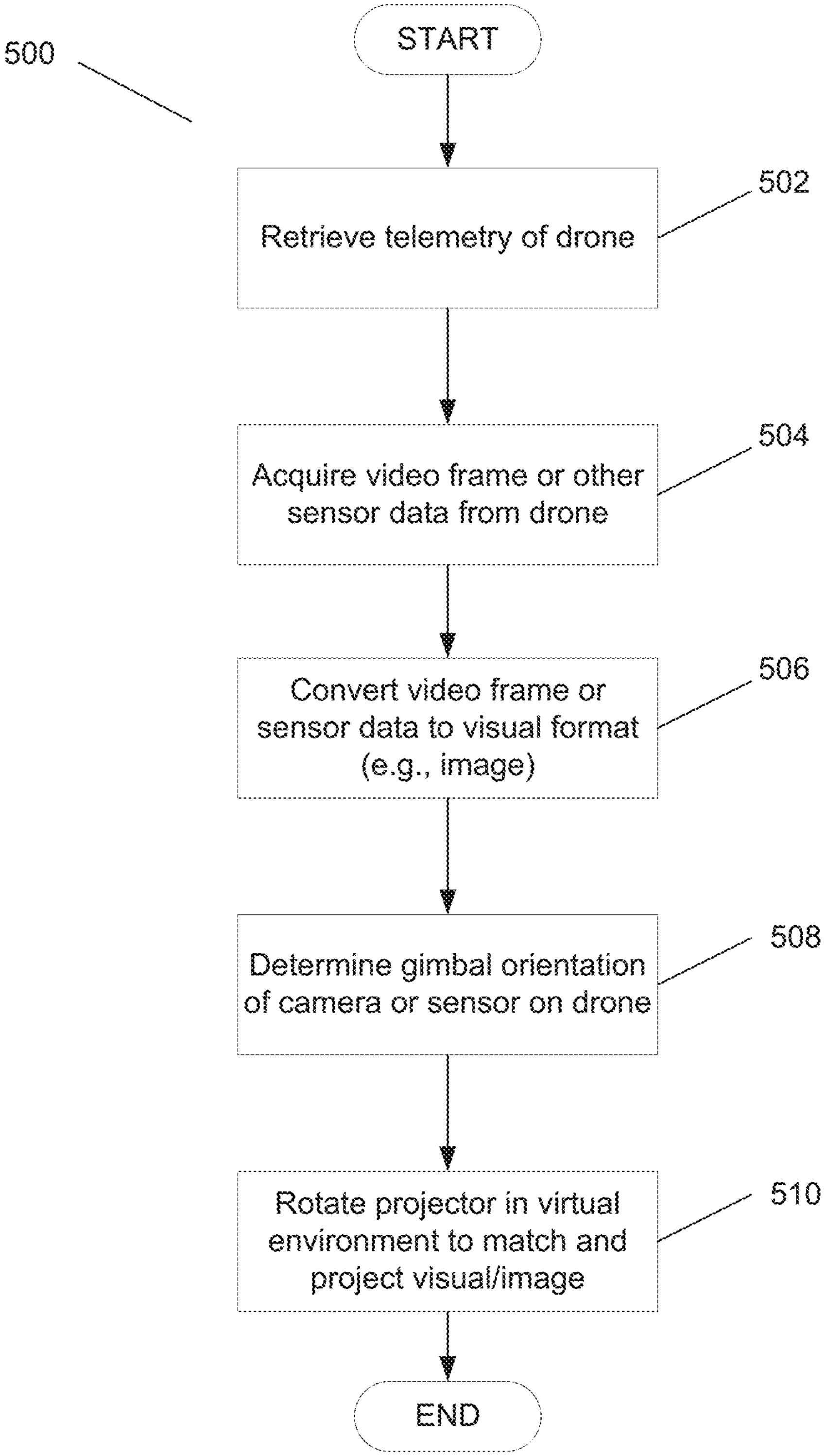
FIG. 5 illustrates a process for projecting sensor data onto a map in accordance with an embodiment of the invention.

Once the location(s) of drone(s) are known, the sensor data captured by the drone(s) can be displayed on the map. FIG. 5 illustrates a process for projecting sensor data onto a map in accordance with an embodiment of the invention.

The process 500 includes retrieving (502) telemetry of a drone. As mentioned above, telemetry can be in JSON or XML format. Sensor data captured by a sensor on the drone is extracted (504) from the telemetry. In some embodiments of the invention, the sensor data is a video frame or portion of video. In other embodiments, sensor data can be multispectral, chemical, auditory, or thermal. As discussed further above, any of a variety of sensors may be utilized on a drone to capture different information about the real-world environment.

The sensor data is converted (506) to a visual format. In some embodiments utilizing video, the video frame is converted into an image (e.g., JPEG).

The orientation of the sensor (e.g., if it is on a gimbal) is determined (508). The orientation can be obtained, for example, from the telemetry, and can include the location or position of the sensor or gimbal; the degree of tilt, roll, and pan of the gimbal; and/or field of view of the camera. In some embodiments, when the location or position of the sensor or gimbal is not provided by the drone, it can be assumed to be at fixed default values or can be retrieved from the drone information database. Field of view may be provided in a measurement, such as degrees, or may be provided by calculating from lens size and sensor size of the camera.

Figure 9:
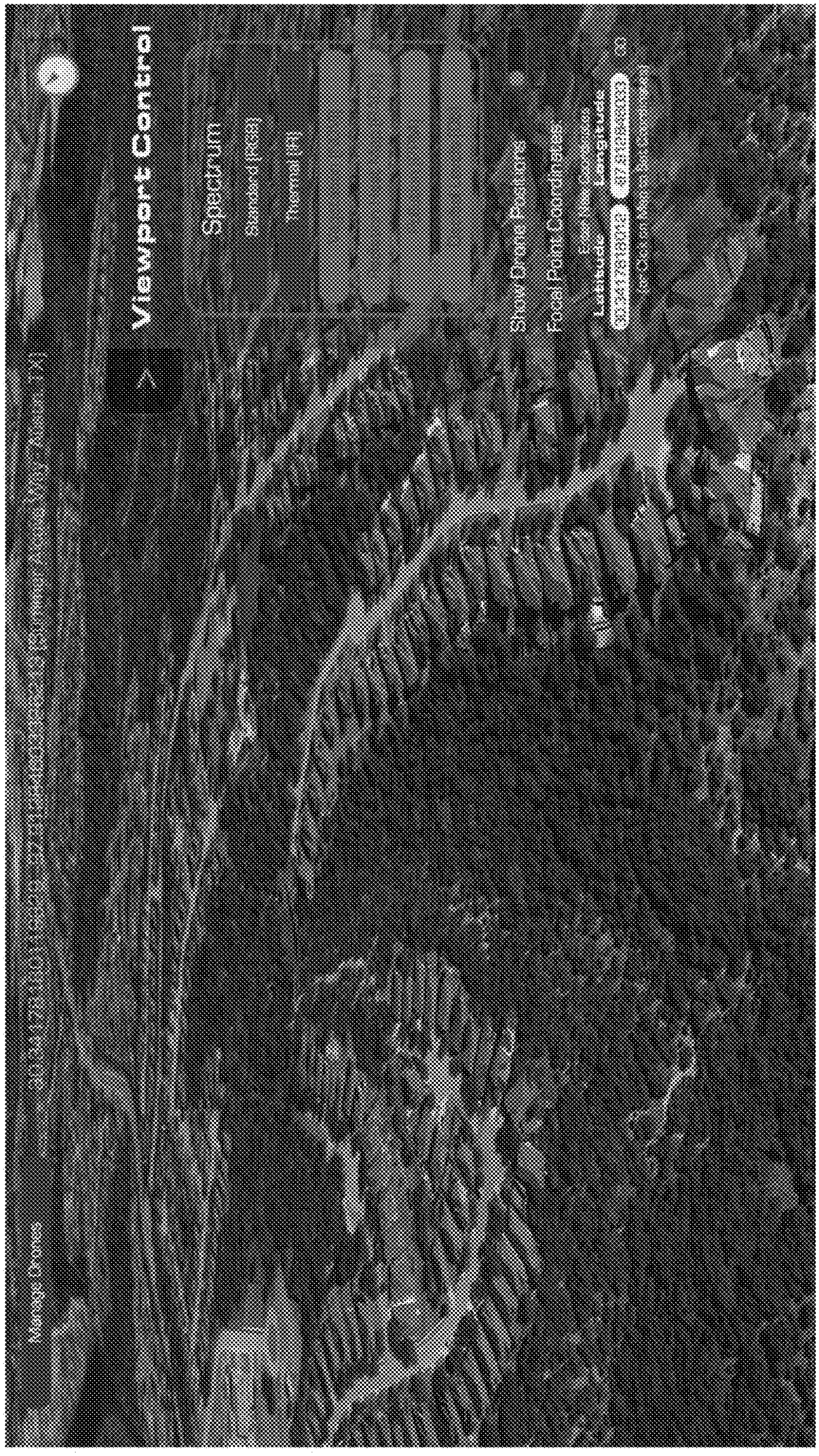
FIG. 9 is an example screen of a graphical user interface showing a map and choices of available sensor data.

A projector associated with the drone is rotated (510) within the virtual environment to match the sensor/gimbal orientation. The visual representation of the sensor data (e.g., image) is projected by the projector onto the map at the proper location and orientation previously determined to match the drone. An example screen of a graphical user interface showing a map and choices of available sensor data as standard (RGB) and thermal (IR) spectrum in accordance with an embodiment of the invention is illustrated in FIG. 9.

In several embodiments of the invention, the projected visual sensor data remains on the map as the drone leaves the corresponding location in the real world. The map can be updated when new sensor data is available (e.g., from a different drone passing over the area or a next pass of the original drone).

Although a specific process is described above with respect to FIG. 5, one skilled in the art will recognize that any of a variety of processes may be utilized in accordance with embodiments of the invention.

Processes for Updating Drone Tasking

Figure 6:
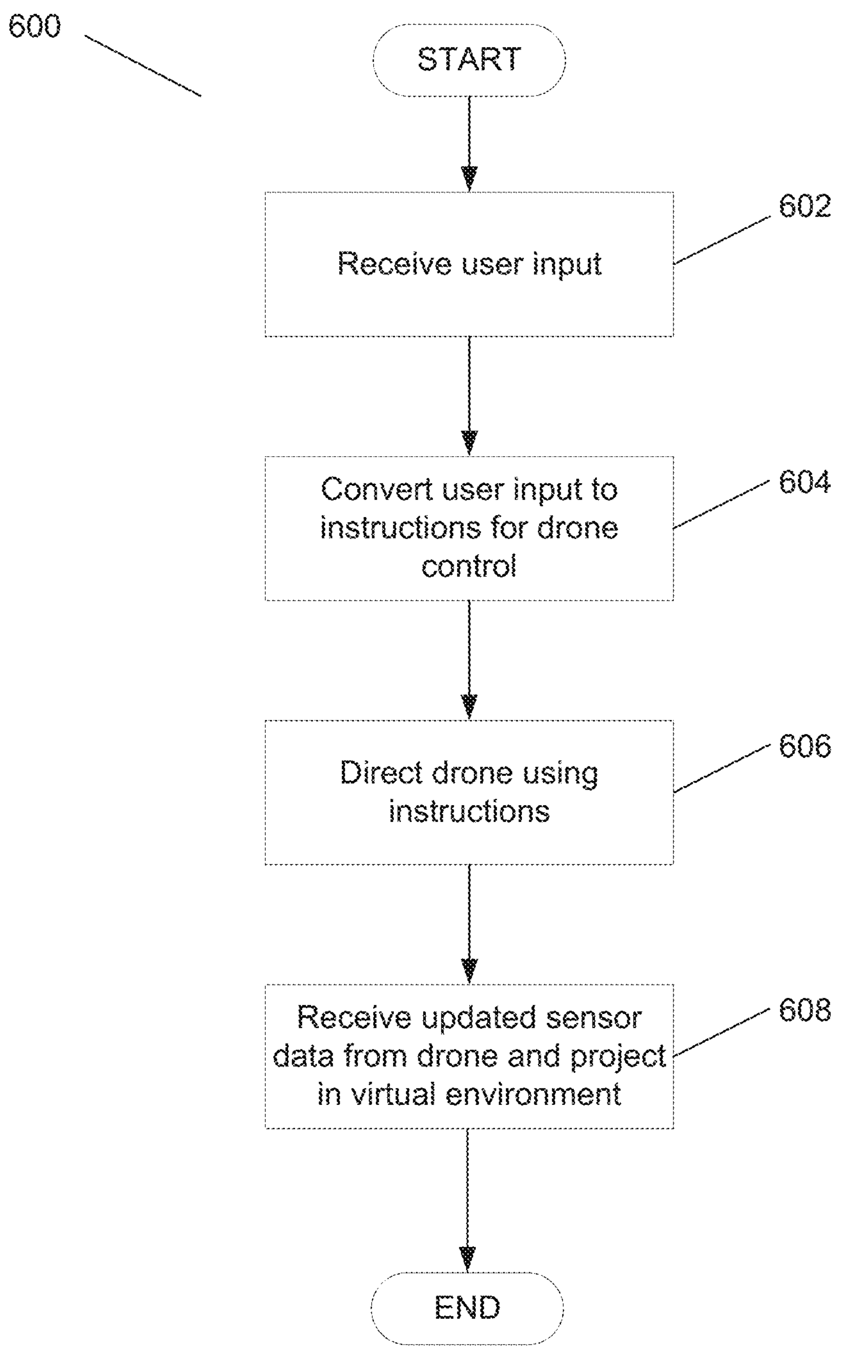
FIG. 6 illustrates a process for updating drone tasking in accordance with an embodiment of the invention.

A user of the system may wish to get up-to-date information in a specific location on the map. They may utilize a controller interface at the command center to task a drone to visit that area. FIG. 6 illustrates a process for updating drone tasking in accordance with an embodiment of the invention.

Figure 10:
FIG. 10 is an example graphical user interface screen showing a UAV's current flight path.
Figure 11:
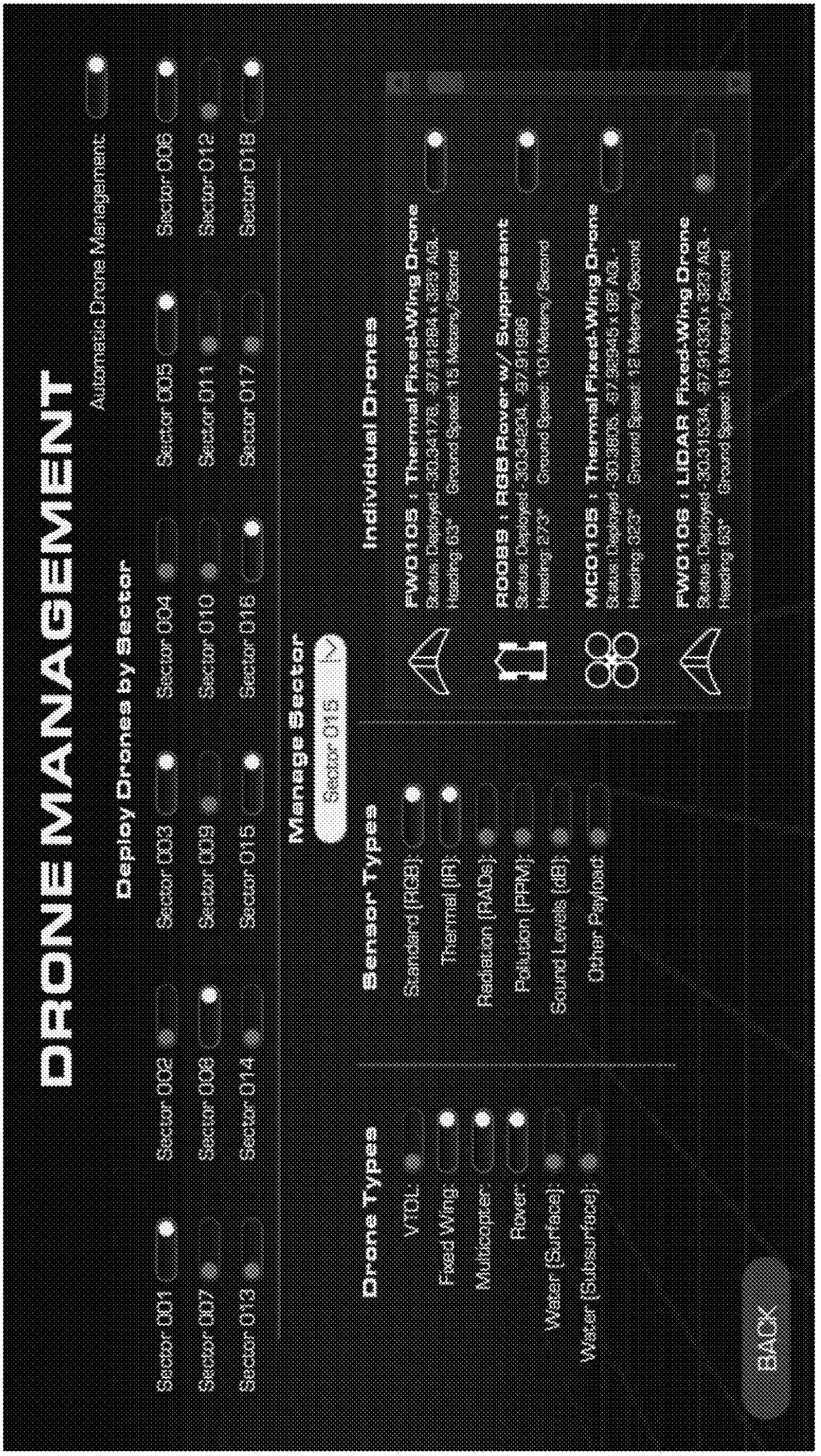
FIG. 11 is an example graphical user interface showing a drone management screen.

The process 600 includes receiving (602) user input. An example graphical user interface showing a drone management screen is illustrated in FIG. 11. The drone management screen can display different filters by types of drones or locations of drones and allow a user to select a specific drone to control. An example user interface screen showing a UAV's current flight path on the map is illustrated in FIG. 10.

The user input can be converted into instructions (604) for drone control. For example, if the user input is a set of WGS83 coordinates, it can be converted into directions for the drone to arrive at those coordinates. If the user input is selection of a location on a map, the coordinates of the location can be determined and then provided as directions for the drone. Alternatively, user input can be given as immediate controls (e.g., forward, reverse, slide or turn left/right, elevation up/down, rotate gimbal, etc.). One skilled in the art will recognize that other variations of drone control are possible. The drone is directed (606) using the instructions.

Updated sensor data is received (608) from the drone and displayed in the virtual environment (e.g., by the drone's associated projector).

Although a specific process is described above with respect to FIG. 6, one skilled in the art will recognize that any of a variety of processes may be utilized in accordance with embodiments of the invention.

CONCLUSION

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for fusing sensor data from drones in a virtual environment, the method comprising:

obtaining geometry data describing a real-world landscape;

drawing a 3-D map within a virtual environment using a 3-D visualization software and the geometry data;

placing a plurality of projectors on the 3-D map within the virtual environment corresponding to sensors in the region of the real-world landscape, where each projector is a projector component instantiated within the 3-D visualization software that has a location and orientation on the 3-D map matching a location and orientation of its corresponding sensor in the real-world landscape;

receiving sensor data and location data from the sensors; and projecting the sensor data onto the 3-D map at locations indicated by the location data using the projectors corresponding to the sensors that the sensor data is received from.

2. The method of claim 1, wherein the geometry data is retrieved from Esri ArcGIS.

3. The method of claim 1, wherein at least some of the sensors are mounted to drones.

4. The method of claim 3, further comprising: receiving user input captured on graphical user interface; directing a drone identified by the user input to move as indicated by the user input.

5. The method of claim 3, where at least one of the drones is in motion.

6. The method of claim 3 wherein placing a plurality of projectors on the 3-D map further comprises:

retrieving a status and type of each drone from a drone information database;

retrieving telemetry and control information of each drone from the drone information database;

receiving telemetry from each drone where the telemetry indicates a location of the drone;

determine location coordinates in the coordinate system of the virtual environment using the telemetry;

placing a projector within the virtual environment at the determined location.

7. The method of claim 1, wherein projecting the sensor data onto the 3-D map further comprises:

retrieving telemetry of a drone;

extracting sensor data from the telemetry;

converting the sensor data to a visual format;

determine an orientation of the sensor from the sensor data was received;

rotating a projector corresponding to the sensor to match the sensor orientation;

projecting the visual format of the sensor data onto the 3-D map using the location data.

8. The method of claim 1, wherein at least some of the sensor data is video.

9. The method of claim 1, wherein at least some of the sensor data is invisible wavelength.

10. The method of claim 1, further comprising rendering the virtual environment on a display.

11. The method of claim 1, wherein the projector components are configured to project sensor data captured by sensors on drones onto the 3-D map in real-time as the drones traverse the real-world landscape.

12. A system for fusing sensor data from drones in a virtual environment, the system comprising:

a plurality of sensors configured to collect sensor data by observing a real-world landscape;

a command center computing system comprising:

a processor;

non-volatile memory comprising a sensor data integration platform application;

where the sensor data integration platform application, when executed, instructs the processor to perform:

obtaining geometry data describing the real-world landscape;

drawing a 3-D map within a virtual environment using a 3-D visualization software and the geometry data;

placing a plurality of projectors on the 3-D map within the virtual environment corresponding to sensors in the region of the real-world landscape, where each projector is a projector component instantiated within the 3-D visualization software that has a location and orientation on the 3-D map matching a location and orientation of its corresponding sensor in the real-world landscape;

receiving sensor data and location data from the sensors; and projecting the sensor data onto the 3-D map at locations indicated by the location data using the projectors corresponding to the sensors that the sensor data is received from.

13. The system of claim 12, wherein the geometry data is retrieved from Esri ArcGIS.

14. The system of claim 12, wherein at least some of the sensors are mounted to drones.

15. The system of claim 12, where the sensor data integration platform application, when executed, further instructs the processor to perform: receiving user input captured on graphical user interface; directing a drone identified by the user input to move as indicated by the user input.

16. The system of claim 12, where at least one of the drones is in motion.

17. The system of claim 12 wherein placing a plurality of projectors on the 3-D map further comprises:

retrieving a status and type of each drone from a drone information database;

retrieving telemetry and control information of each drone from the drone information database;

receiving telemetry from each drone where the telemetry indicates a location of the drone;

determine location coordinates in the coordinate system of the virtual environment using the telemetry;

placing a projector within the virtual environment at the determined location.

18. The system of claim 12, wherein projecting the sensor data onto the 3-D map further comprises:

retrieving telemetry of a drone;

extracting sensor data from the telemetry;

converting the sensor data to a visual format;

determine an orientation of the sensor from the sensor data was received;

rotating a projector corresponding to the sensor to match the sensor orientation;

projecting the visual format of the sensor data onto the 3-D map using the location data.

19. The system of claim 12, wherein at least some of the sensor data is video.

20. The system of claim 12, wherein at least some of the sensor data is invisible wavelength.

21. The system of claim 12, where the sensor data integration platform application, when executed, instructs the processor to perform rendering the virtual environment on a display.

22. The system of claim 12, wherein the projector components are configured to project sensor data captured by sensors on drones onto the 3-D map in real-time as the drones traverse the real-world landscape.

* * * * *